US009071518B2

(12) United States Patent
Malik et al.

(10) Patent No.: US 9,071,518 B2
(45) Date of Patent: Jun. 30, 2015

(54) RULES BASED ACTIONS FOR MOBILE DEVICE MANAGEMENT

(75) Inventors: Jatin Malik, Bangalore (IN); Ratnesh Singh, Bangalore (IN); Rajakumar Bopalli, Bangalore (IN)

(73) Assignee: FIBERLINK COMMUNICATIONS CORPORATION, Blue Bell, PA (US)

( * ) Notice: Subject to any disclaimer, the term of this patent is extended or adjusted under 35 U.S.C. 154(b) by 0 days.

(21) Appl. No.: 13/540,142

(22) Filed: Jul. 2, 2012

(65) Prior Publication Data

US 2013/0007245 A1 Jan. 3, 2013

Related U.S. Application Data

(60) Provisional application No. 61/503,729, filed on Jul. 1, 2011.

(51) Int. Cl.
```
G06F 15/173    (2006.01)
H04L 12/26     (2006.01)
H04L 12/24     (2006.01)
H04L 29/06     (2006.01)
H04W 12/08     (2009.01)
H04W 12/12     (2009.01)
```

(52) U.S. Cl.
CPC ........ H04L 43/0817 (2013.01); H04L 41/0816 (2013.01); H04L 41/0893 (2013.01); *H04L 63/10* (2013.01); *H04L 63/20* (2013.01); *H04W 12/08* (2013.01); *H04W 12/12* (2013.01)

(58) Field of Classification Search
CPC ............ H04L 41/0816; H04L 43/0817; H04L 41/0893; H04L 41/0618
USPC ............... 709/223, 224; 455/26.1, 425, 456.5
See application file for complete search history.

(56) References Cited

U.S. PATENT DOCUMENTS

| | | | |
|---|---|---|---|
| 8,499,331 B1* | 7/2013 | Yehuda et al. | 726/1 |
| 2003/0115322 A1* | 6/2003 | Moriconi et al. | 709/224 |
| 2006/0217111 A1* | 9/2006 | Marolia et al. | 455/418 |
| 2007/0143851 A1 | 6/2007 | Nicodemus et al. | |
| 2007/0156659 A1 | 7/2007 | Lim | |
| 2007/0206552 A1 | 9/2007 | Yaqub et al. | |
| 2007/0266422 A1 | 11/2007 | Germano et al. | |

(Continued)

FOREIGN PATENT DOCUMENTS

| | | |
|---|---|---|
| WO | 2005064498 A1 | 7/2005 |
| WO | WO 2008110215 A1 * | 9/2008 |

(Continued)

OTHER PUBLICATIONS

International Search Report and Written Opinion mailed Sep. 28, 2012 for corresponding International Application No. PCT/US2012/045252.

(Continued)

*Primary Examiner* — Kostas Katsikis
(74) *Attorney, Agent, or Firm* — Pepper Hamilton LLP

(57) ABSTRACT

Utilizing a server-based rules-based action framework, methods and systems gather status and configuration information about each of a plurality of mobile devices, which include devices from different mobile platforms. At the server, software processes monitor status information and respond automatically to changes, causing administrator-selected rules to be evaluated to determine if an action should automatically be initiated.

23 Claims, 10 Drawing Sheets

(56) References Cited

U.S. PATENT DOCUMENTS

| | | |
|---|---|---|
| 2008/0109871 A1 | 5/2008 | Jacobs |
| 2008/0114862 A1 | 5/2008 | Moghaddam et al. |
| 2009/0131020 A1* | 5/2009 | van de Groenendaal ..... 455/411 |
| 2010/0048167 A1* | 2/2010 | Chow et al. ................... 455/410 |
| 2010/0242088 A1 | 9/2010 | Thomas |
| 2011/0145920 A1 | 6/2011 | Mahaffey et al. |
| 2011/0167474 A1* | 7/2011 | Sinha et al. ....................... 726/1 |
| 2012/0151041 A1* | 6/2012 | Gerber et al. ................. 709/224 |
| 2012/0179802 A1* | 7/2012 | Narasimhan et al. ......... 709/223 |
| 2012/0240183 A1* | 9/2012 | Sinha ................................ 726/1 |
| 2013/0305101 A1* | 11/2013 | Gupta et al. ................. 714/47.3 |
| 2015/0006681 A1* | 1/2015 | Lim et al. ...................... 709/219 |

FOREIGN PATENT DOCUMENTS

| | | |
|---|---|---|
| WO | WO 2010129939 A1 * | 11/2010 |
| WO | 2011022053 A1 | 2/2011 |

OTHER PUBLICATIONS

Supplementary European Search Report mailed Feb. 5, 2015 in corresponding European Patent Application No. 12808145.2.

* cited by examiner

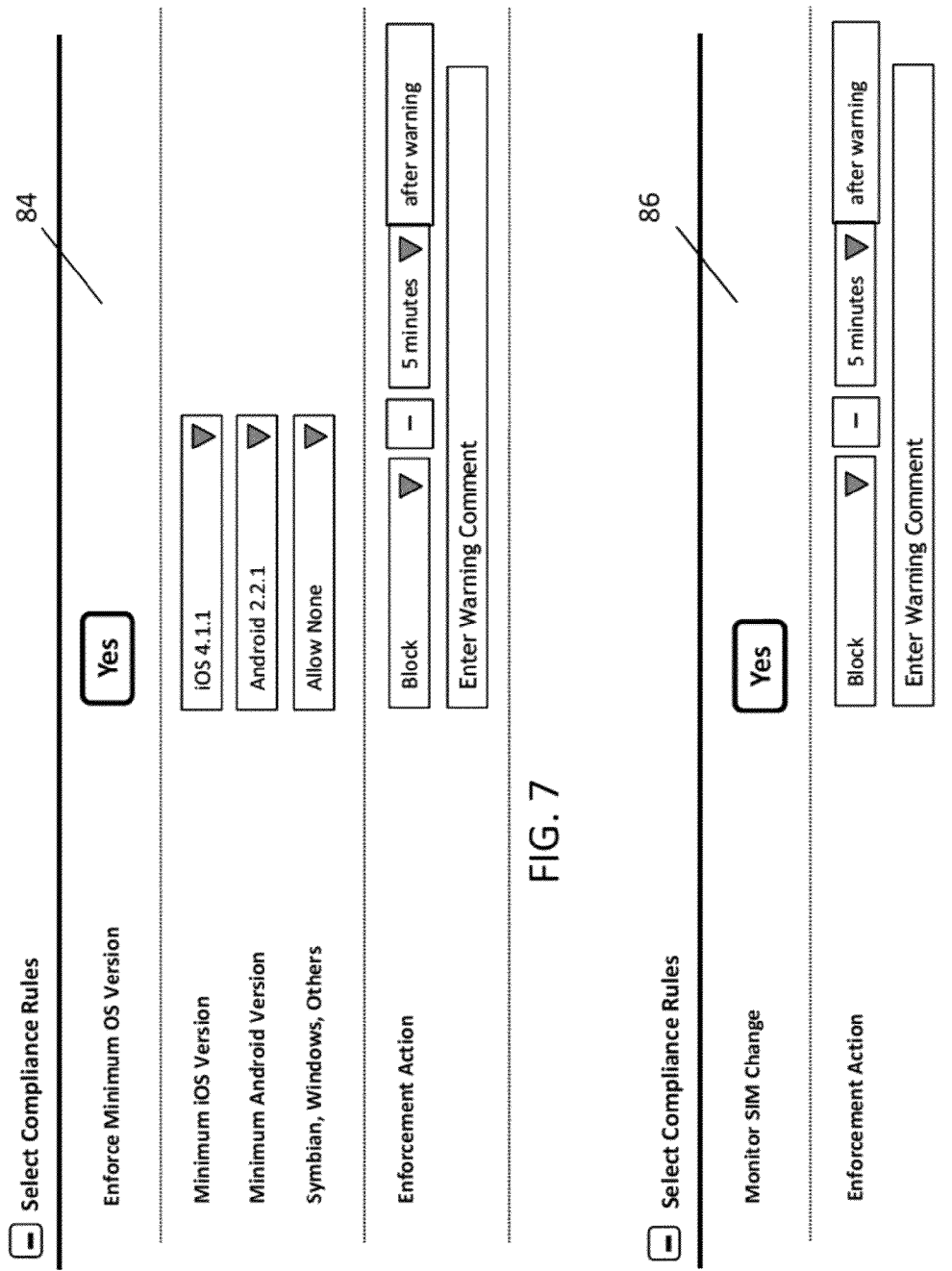

☐ Administrator List for alert deliveries

Enter email addresses to be alerted on for actions taken

[Enter email address] ⊕ ⊖

[Enter email address] ⊕ ⊖

☐ Exemption List

Select Group that you want to be exempt from Enforcement actions Actions will not be executed on Devices in this group. You can also manually maintain this list by individually marking the Device attribute "Special Devices" as "Yes".

☐ Select Enforcement Rules

> Enforce MaaS360 Enrollment ☐
> Ensure iOS and Android devices are enrolled in MDM and advanced management of the device has not been disabled or removed by the user.

> Enforce OS Versions ☐
> Ensure that your managed devices are up to date with the required OS versions. Please note that version check may be invalid on Rooted or Jailbroken devices.

> Enforce Remote Wipe Support ☐
> Ensure managed devices support remote wipe capabilities.

> Enforce Encryption Support ☐
> Ensure managed devices support designated levels of encryption.

> Enforce Application Compliance ☐
> Ensure devices are in compliance with application management requirements (required, disallowed & white list policies). Application compliance is based on policy settings assigned to managed devices.

> Restrict Jailbroken (iOS) and Rooted (Android) Devices ☐
> Ensure managed devices are not jailbroken or rooted. The MaaS360 Application is required for Jailbreak detection on iOS devices.

> Restrict Corporate Resources for Blocked Devices ☐
> Ensure that devices blocked on your mail server can not access corporate resources such as Wi-Fi or VPN.

RULES BASED ACTIONS FOR MOBILE DEVICE MANAGEMENT

CROSS-REFERENCE TO RELATED APPLICATIONS

This application claims priority to U.S. provisional application Ser. No. 61/503,729 filed Jul. 1, 2011, entitled "Rules based Actions for Mobile Device Life Cycle Management System," which is incorporated herein by reference in its entirety.

TECHNICAL FIELD

The present invention relates generally to methods and systems for providing mobile device management and more specifically providing remote management of mobile devices at a server using rules based actions.

BACKGROUND

The general trend in corporate network management is the addition of mobility of users of the corporate network. Whereas traditional corporate networks have included a LAN and local desktop devices, the recent trend has been the introduction of mobile devices, such as smart phones, that are used by employees to work and access corporate resources remotely. While allowing users to work remotely is desirable within an organization, from an IT perspective the mobility of users can present certain challenges.

A common challenge in organizations that allow mobile access to users is the need for reliable security solutions. For example, users within an organization may use several different platforms for accessing resources within a network. Users may use smart phones, such as Blackberries, iPhones, and Android devices, tablet computing devices, such as iPads or similar offerings with other mobile operating systems, laptops, or home desktops. The diversity of devices and operating systems employed by these devices can make it difficult to ensure security when users access computing resources within an organization's network. Furthermore, as mobile devices become more powerful and ubiquitous, users typically utilize a single device for both business and pleasure. Device users demand the ability to customize their devices, including their own personal preferences, data, and applications—many of which may be counter to the security or management goals of an organization.

Unlike traditional network management where devices share common operating system features, such as a network of desktops that all use a common Microsoft Windows operating system, mobile devices often utilize different operating systems, each of which may have different capabilities from a management and security standpoint. For example, for the last decade, corporate users commonly used Blackberry devices from Research in Motion ("RIM"), which allowed uniform remote access to status information and some actions via the Blackberry Enterprise Server ("BES"). New popular devices, such as those from Apple and manufactures that utilize Android and Windows Mobile, approach management and security differently, providing differing levels of out-of-the box management functionality. As these devices become part of the corporate ecosystem, IT managers are taxed with managing and/or providing security against threats related to a spectrum of devices. It is generally infeasible for most IT managers to develop expertise in each of the different rapidly-changing mobile platforms to manage these devices. There remains a need to simplify the management and configuration of these mobile devices by an IT manager.

SUMMARY

Applicants have recognized and appreciated that certain problems with the prior art can be solved by utilizing a server-based rules-based action framework. A server can include a plurality of front ends the gather status and configuration information about each of a plurality of mobile devices, which include devices from different mobile platforms. At the server, software processes monitor status information and respond automatically to changes, causing appropriate rules to be evaluated to determine if one is triggered. Each rule includes conditions and an action pre-selected by an administrator, which will automatically be initiated. Rules may be defined using a user interface, allowing an administrator to define rules in a simple manner without requiring the administrator to define how to collect status information from various mobile platforms, allowing rules to work across multiple platforms and simplifying the administrative process.

One embodiment is directed to a method for providing device management services, including steps of gathering, status information from a network, related to each of a plurality of mobile devices, each mobile device utilizing one of a plurality of different mobile operating systems and storing the status information in an electronic database accessible to a server. The method then evaluates a first compliance state of at least one of the mobile devices from the status information using a plurality of administrator-defined rules; and initiates at least one action defined by the user-defined rules in response to the step of evaluating. The step of evaluation is performed by a server automatically, in response to changes in the status information.

According to one aspect of some embodiments, the action is selectable from a plurality of actions, comprising by blocking access to the at least one of the mobile devices to a corporate resource. The action may also include blocking e-mail access for the at least one of the mobile devices, wiping information from the at least one of the mobile devices, or warning a user of the at least one of the mobile devices that further action may be taken. According to another aspect of some embodiments, the step of gathering status information, for the at least one mobile device, includes gathering information from that mobile device and at least one other source on the network. According to still another aspect of some embodiments, the method includes the step of subsequently evaluating a second compliance state of at least one of the mobile devices to determine if the at least one action should be revoked. In yet another aspect of some embodiments, the plurality of different mobile operating systems includes Android and iOS. In yet another aspect of some embodiments, the status information collected includes location information about the mobile device.

Another embodiment is directed to a method for providing device management services including steps of making a determination that an attribute of a mobile device has changed and evaluating the attribute, by a processor at a server in response to the determination, to determine if it triggers at least one of a plurality of administrator defined rules, which indicates that the attribute is out of compliance. If the attribute is out of compliance, and the method automatically initiates, by the server, an action defined by the at least one of a plurality of administrator defined rules. The attributes are stored in a data store accessible to the server that includes substantially real-time data pertaining to a plurality of attributes of a plurality of mobile devices, comprising devices having different mobile operating systems.

According to one aspect of some embodiments, the step of automatically initiating an action includes warning a user of the mobile device that the device is out of compliance and subsequently causing the action to be performed if the attribute remains out of compliance after a period of time defined in the rule. According to another aspect of some embodiments, the method includes the step of automatically revoking the action if the attribute is brought back into compliance and may include determining if another of the plurality of rules is triggered. According to still another aspect of some embodiments, the method includes the step of gathering the plurality of attributes for at least one of the plurality of mobile device by gathering attribute information from that mobile device and at least one other source on a network. In yet another aspect of some embodiments, the plurality of different mobile operating systems includes Android and iOS. In yet another aspect of some embodiments, the attribute collected includes location information about the mobile device.

Another embodiment is directed to a system for providing device management services including a data store configured to be accessible by a server and computer readable instructions for execution on the server, configured to make a determination that an attribute of a mobile device stored in the data store has changed. The instructions are further configured to evaluate the attribute, in response to the determination, to determine if it triggers at least one of a plurality of administrator defined rules, which indicates that the attribute is out of compliance and automatically initiate an action defined by the at least one of a plurality of administrator defined rules if the attribute is out of compliance. The data store is configured to include substantially real-time data pertaining to a plurality of attributes of a plurality of mobile devices, comprising devices having different mobile operating systems.

According to one aspect of some embodiments, the computer readable instructions include instructions configured to present a user interface to an administrator to allow selection of at least one attribute and one available action to define the at least one of the plurality of administrator defined rules. According to another aspect of some embodiments, at least one of the action includes warning a user of the mobile device that the device is out of compliance and causing subsequent action to be performed if the attribute remains out of compliance after a period of time defined in the at least one rule. According to yet another aspect of some embodiments, the computer readable instructions further comprise instructions configured to automatically revoke the action if the attribute is brought back into compliance.

According to still another aspect of some embodiments, the computer readable instructions include instructions configured to gather the plurality of attributes for at least one of the plurality of mobile device by gathering attribute information from that mobile device and at least one other source on a network. According to another aspect of some embodiments, the plurality of different mobile operating systems comprises at least Android and iOS. In yet another aspect of some embodiments, the attribute collected includes location information about the mobile device.

It should be appreciated that all combinations of the foregoing concepts and additional concepts discussed in greater detail below (provided that such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6, 7, and 8 are exemplary templates for configuring rules-based actions for use with certain embodiments of the present invention;

FIG. 9 is a screenshot of exemplary settings for use with certain embodiments of the present invention;

FIG. 10 is a screenshot of available rules that may be configured by an administrator for use with certain embodiments of the present invention.

DETAILED DESCRIPTION OF EXEMPLARY EMBODIMENTS

Figure 1:
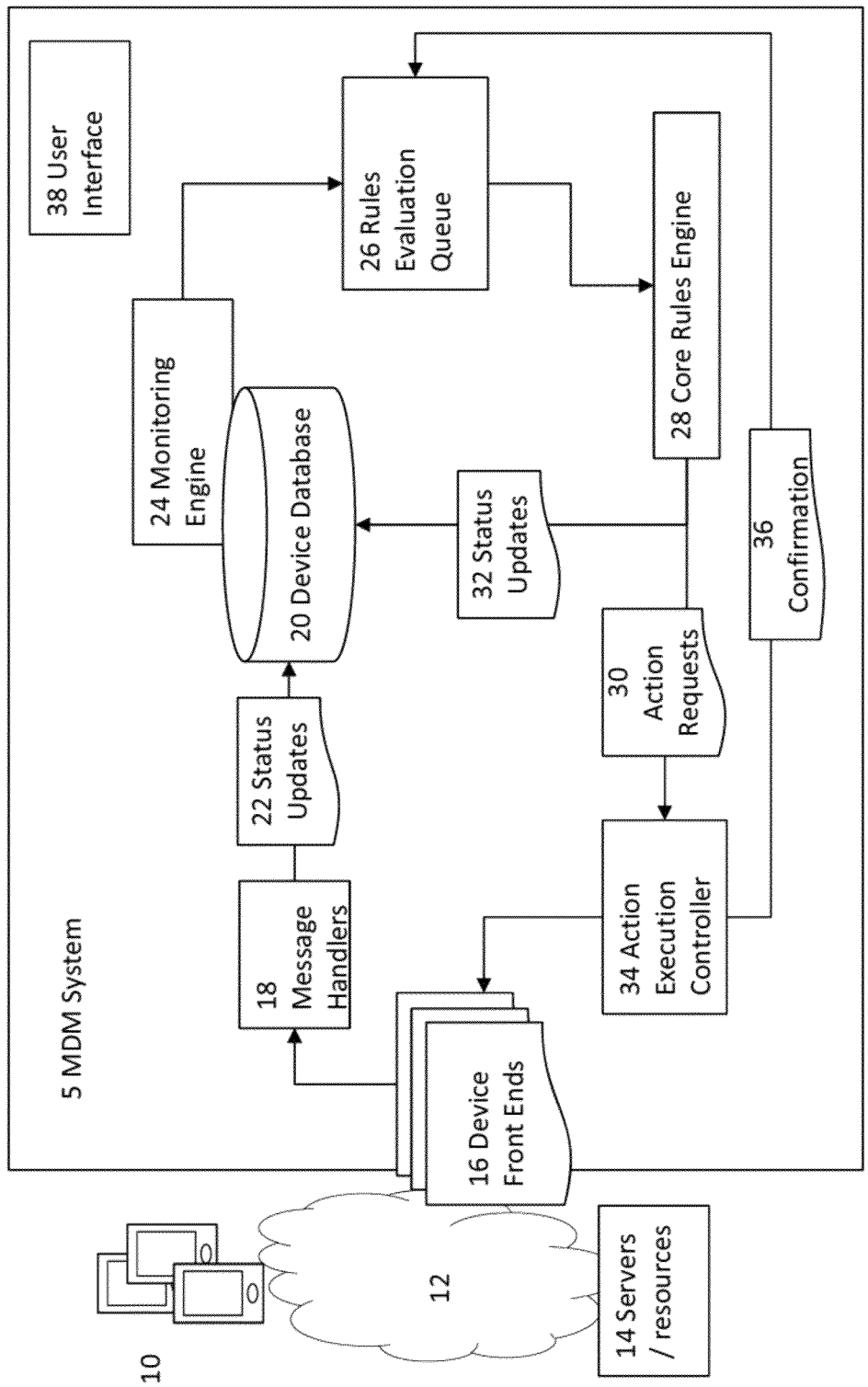
FIG. 1 is a system diagram of an exemplary mobile device management (MDM) system for use with certain embodiments of the present invention.

The present invention solves many issues of managing a plurality of mobile devices by providing a server-based rules system for gathering status and configuration information related to each mobile device being managed and applying administrator-defined rules to automatically carry out actions to assist in managing the devices. By enforcing rules at the server level, rules can be uniformly defined and applied without requiring an administrator to have special expertise with each mobile platform. While subsets of the mobile devices can each have differing operating systems, a front end of the server can be adapted to handle the nuance of interacting with each mobile device and may be further configured to interact with a plurality of sources to develop a more complete view of each mobile device and to further to carry out actions on the device to enforce the rule. Status and configuration information (collectively "status information") gathered about each mobile device can be placed in a datastore. This status information can be monitored for changes by one or more processes on the server. Changes to the status information of each device can be placed in one or more queues for application of rules. Certain conditions may bring the device out of compliance, and according to the administrator-defined rules, corrective action can be automatically taken on the device (such as by displaying a warning message to the user) or on the server (such as by restricting access to corporate resources at the server). In some embodiments, the administrator's interaction with the system may be limited to defining server-enforced rules, without burdening the administrator with the details of the server's interaction with the devices to gather information and take actions. The can result in a system that can be more easily scaled and adapted to a plurality of mobile operating systems without complicating the administrative experience. As a result, a mobile device management ("MDM") system can adapt to changes in mobile platforms and allow less specialized (or busy) IT personnel to manage a plurality of mobile devices in an automated manner. Mobile devices can include, in some embodiments, smart phones, such as BlackBerries, iPhones, and Android devices, tablet computing devices, such as iPads or similar offerings with other mobile operating systems or other portable computing devices, such as laptops.

In some embodiments, an MDM system provides features that allow an administrator to easily handle the entire lifecycle of a mobile device. As used herein, an administrator is any user that interacts with the MDM system to define and select rules or who actively participates in the monitoring or management of the mobile devices through an MDM system. For example, by gathering information from each mobile device that accesses a corporate network, mobile device inventory can be monitored to provide real-time inventory information. In some embodiments, an administrator can access the system for at-a-glance details of the overall status of the devices that access the network. In some embodiments, a dashboard can be presented that lists all devices registered with the network (which may or may not currently be online), including the ability to click to drill down into the status of each device or to provide a statistical snapshot of the device status information. For example, a dashboard can show the number of iOS device registered, the version of the operating system ("OS"), the number that are running file-sharing applications, and the number that have enabled a 4 digit passcode to authenticate the user. In some embodiments, administrator can select a group of devices or individual devices and obtain more detailed information.

Examples of the information that can be gathered about each mobile device include, but are not limited to: the device model and manufacture information; applications (commonly referred to as "apps") installed on the device; certificates on the device; user profile information; the character of any passcode used to authenticate a user (e.g. whether a password/passcode is used and the relative strength of that password, such as the number of characters); operating system of the device; information regarding whether the device operating system has been tampered with by the user (e.g. an iOS device has been jailbroken, or an android device has been rooted); and the data usage (e.g. the amount of MB or GB used for a given billing period, the amount data used while roaming, or the relative amount compared to a data plan used by the user—which may be useful for monitoring or controlling costs where an organization pays for data usage).

In addition to gathering information about each device that can be used for monitoring device status, an exemplary MDM system can include management features that allow configuration of mobile devices and the resources they access. For example, an MDM system may communicate with certain mobile device operating system components or applications on the mobile device to change settings to comply with certain corporate policies. For example, after a device user registers his device, the MDM system can instruct the user (via any suitable message, including an email or pop-up message) to download an app to access the corporate email server, which can be remotely configured or come preset with the appropriate settings to access the email server. Furthermore, the MDM system may interact with apps on the mobile device, other servers that the device accesses, corporate resources, or the OS, via remote procedure calls or network requests to change settings. These settings can alter the way the mobile device accesses or interacts with other resources on the network. An exemplary MDM system can remotely change configuration settings related to the mobile device. It should be noted that the specific character of configuration information available to the MDM system may vary by mobile device platform (i.e. iOS platform device, Android platform device, Blackberry platform devices, windows mobile/phone devices). Similarly, in some embodiments, the type of configuration information can be substantially the same across platforms, while the method for configuring the devices varies by platform. For example, a BlackBerry device may be configured to set up email and data access by interaction between the MDM server and the Blackberry Enterprise Server ("BES"), while an Android device may be configured by interaction between the MDM server and a client app on the device, which may in turn change settings in the OS utilizing APIs provided by the OS.

Examples of configuration settings that may be managed by the MDM system include, but are not limited to: email settings, VPN access settings, user profiles, Wi-Fi profiles, authentication certificates used by the device to securely access corporate resources.

The MDM system also can provide security or resource management functionality. For example, the MDM system can apply security or management policies to the status information retrieved from mobile devices. By applying policies, certain actions can be taken on devices, depending on their status. These actions can include security actions, such as restricting access to corporate resources when a device is out of compliance. In some embodiments, policies can be of a resource management character. For example, a policy may observe the data usage of a mobile device and determine if too much data is being used. In cases where data usage exceeds a normal usage pattern, an administrator can be notified or a user can be warned that he is approaching his data limit.

Examples of security policies that may be used by the MDM system can include, but are not limited to: requiring users have a passcode to access their device, including defining the minimum passcode strength required; restricting access to devices that have been routed or are running certain apps (e.g., blacklisted apps, such as file-sharing apps); requiring that the user run certain apps, such as security apps or access clients; remotely wiping the device back to factory settings or wiping a portion of data stored on the device when a device appears compromised or is reported missing; and limiting access of devices that run versions of a mobile OS or on supported OSs. It should be noted that limiting access can include preventing access, restricting access, changing the nature of the access, or providing access to certain resources, while limiting access to other resources, etc. examples of resource management policies that may be used with the MDM system include, but are not limited to: alerting the user or an administrator; preventing email access from the device; restricting access to corporate Wi-Fi, VPN etc.; restricting access to corporate documents on the device; removing all corporate content and configuration from the device; and removing all personal and corporate data and settings from the device.

While the exemplary MDM systems are described as server-based, it should be appreciated that the system can be implemented on a plurality of servers, including cloud-based systems which may deploy the system on a plurality of servers on a dynamic basis, allowing for greater scalability. Any portion of the exemplary MDM systems can be executed on one or more processors, which may be separate from the processors executing other portions of the MDM system. A system may be implemented as part of the local IT infrastructure of a corporate environment or as part of a third party solution employed by the organization. The components of an MDM system on a server include software operating on one or more processor. This software can include software instructions, written in any suitable manner stored on non-transient computer readable media, such as optical, magnetic, or solid-state memory devices. For example, the systems and methods described with respect to FIGS. 1-4 can include software instructions operating on one or more processors.

As used herein, a corporate network should be considered a term for any network used by an organization that includes resources, such as Exchange servers, that need to be configured behind a firewall. Generally, a corporate network will include at least one local area network that is used by the organization. This can include campus networks used by universities or other institutions or networks used by corporations or small businesses. The corporate network may be large or small, and some networks may be maintained by a local IT staff. A corporate network can further be composed of multiple networks that interact with shared corporate computing resources, such as BlackBerry Enterprise servers (BES). In some embodiments corporate networks are synonymous with customer premises. It should also be understood that references to corporate, corporations, organizations, etc., may be interchangeable and are not intended to be limited to commercial business organizations. While many of the embodiments described herein are described with reference to corporate environments, these embodiments are merely illustrative and can also apply to the computing environment of any organization that has a need for remote management of network resources via a cloud-based approach.

Corporate resources can include any of the resources, such as servers, data, credentials, e-mail and exchange services that may be part of, or accessed by, the corporate network. Corporate resources can include those resources that may be ordinarily made available to users of mobile devices when the mobile devices are in compliance with security and management policies. When a mobile device is brought out of compliance with these policies, restricting access to all or a subset of corporate resources may be an appropriate action as defined by the rules based policies. When a mobile device returns to compliance, an appropriate action may include restoring access to the resources may be an appropriate action.

By providing rules based actions and MDM system, some embodiments may have certain advantages over conventional IT management. For example, security and compliance of mobile devices can be substantially automated. Each mobile device can be required to enroll with the MDM system before accessing corporate resources. Enrolled mobile devices can then be automatically managed by the MDM system using rules based actions. This can result in reduced cost of managing mobile device infrastructure. Because rules based actions can be applied automatically, IT managers can be freed up to fulfill other roles in the organization. Furthermore, rules based actions can provide a simplified front-end for managing mobile devices that may require less training and expertise of IT personnel. For example, an IT manager may not need to know the details of how Apple's iOS platform accesses device status information and enforces policy rules, but he may be able to identify the desired policies for enforcing on iOS devices, or mobile devices, in general.

A server-based MDM system can apply policies to information gathered from multiple sources and gathered in multiple ways. A server-based MDM system allows gathering information from sources other than just the device, which can be tailored to the mobile device platform. It should be appreciated that the MDM system may use one or more app on a mobile device to assist in gathering information for applying policies at the server, depending on the mobile platform. Because the system applies policies at a server, in some embodiments, the device capabilities and the method by which the server gathers information about a device can be separated from the logic that applies the policies, allowing powerful policies to be created uniformly for multiple mobile device platforms, while the application details of applying the policy to multiple device may vary. For example, while one mobile operating system may allow an app on the device that performs compliance analysis of the device status, another mobile operating system may not. By moving the compliance testing and action decision to the server, the MDM system may gather information from the devices in any manner suitable for the type of device being monitored. At the server, rules may then be applied more uniformly across device platforms.

While embodiments of the MDM system are contemplated to adapt to any appropriate mobile device platform, it may be helpful to understand an MDM system in the context of exemplary known mobile platforms. For example, RIM's BES for BlackBerry devices provides a centralized resource in the form of an enterprise server that maintains status information about BlackBerry devices registered with the BES. The BES can push notifications to BlackBerry devices and request and maintain status information for his devices. The MDM system may interact with the BES to gather status information pertaining to the device.

Android devices, on the other hand, do not necessarily communicate with an enterprise server. Status information can be gathered from an Android device by using an app on the phone/mobile device, which communicates with the device's OS via an API, to gather or maintain status information while running Remote procedure calls can be used by an MDM server to communicate with the app on the mobile device. An app may also be able to change certain settings on the device, such as Wi-Fi, e-mail, and network settings. The app may also respond to notifications from the MDM server to display messages to the user. An app may require that a user agrees to authorize the app at installation, which may allow the app to register with the operating system to access sensitive status information about the device.

Devices using Apple's iOS may require that the MDM system interact with a server provided by Apple. Apple's server may act as a trusted party for remote procedure calls, acting as a proxy for status requests from the MDM system to the mobile device. When a user enrolls his mobile device with the MDM system, the mobile device may download a certificate from Apple that can be used to authenticate communication to and from the mobile device. The MDM system may communicate through the Apple server to change configuration settings on the mobile device or to request that the device send status information to the MDM server.

The MDM system may require that users enroll or register with the MDM system to put the device into a managed state, whereby the MDM system can collect status information about the mobile device and enforce policies by sending certain actions to the device, such as remote wipe actions (including erasing all information from a device, or selectively erasing a portion of the information, such as sensitive date). An exemplary enrollment may include sending the user a webpage, e-mail, or SMS message, or having the user download an app. In response to the message or app, the user may be directed to a URL where configuration information and security certificates can be downloaded. Once certificates are downloaded from a certificate authority the identity of the mobile device can be trusted. This may also allow the communication with the mobile device to be encrypted for added security.

It should be noted that information about mobile devices can be gathered directly from the mobile device in certain instances, or from a third-party server, such as the BES server. In addition, status information about network access may be gathered from any corporate resources that the device is accessing. Similarly, third-party authorities may provide identity information, such as when a user logs into a device using his Google credentials.

Furthermore, actions can be taken with respect to the device by interacting with any of these components. For example, if an action requires a remote wipe of the device, the action may be taken by sending a remote procedure call to the device, including sending it to an app or to the operating system of the device to carry out the responsive wipe of information. Similarly, actions resulting in limiting access to corporate resources can be taken at the device, such as by changing configurations of any client apps on the phone to limit access to a remote resource, or at a server which may be part of the corporate network or corporate resource. For example, when a user's device is out of compliance, a VPN server may limit access to corporate data when a user logs on to the VPN. Remote configuration performed by the MDM system can include remotely changing configuration information on the user device or on any chosen corporate resource.

By providing a rules-based management system that the server, a simplified administrative experience can be provided, which may be agnostic from the administrative standpoint to the type of mobile device being managed. Rules allow the administrator to define certain status conditions, such as installation of blacklisted apps, that trigger a responsive action. The action may be an action defined by the administrator that is appropriate to the out-of-compliance condition. For example, the action can include warning the user via an e-mail or pop-up message that he is not allowed to use certain applications on devices that access corporate resources. The rules may include further responsive actions if the out of compliance condition continues, such as sending alerts to IT administrators that the user has failed to uninstall blacklisted app. This can allow administrators to directly interact with the user to get the offending application uninstalled. This may be suitable response where the device operating system does not provide the ability to remotely uninstall specific applications. Similarly, a rule may be defined such that after a certain period of time since the user was first warned, access from mobile device to a corporate resource can be restricted or blocked at the device or server level.

FIG. 1 demonstrates the components of an exemplary embodiment of an MDM system 5. MDM system 5 interacts with mobile devices 10 through network 12. Network 12 can include any reasonable network, including the Internet. MDM system 5 may also interact with servers and other resources 14 on the Internet. Servers and resources 14 can include resources that interact with mobile devices 10, such as BES servers, corporate resources, or third-party servers. Mobile devices 10 may access servers and resources 14 as part of their normal behavior while being managed by MDM system 5. For example, servers and resources 14 may include an Exchange server for providing email access to mobile devices 10. During normal in-compliance operation, the mobile devices can freely access email in this manner; during out of compliance operation, such access may be restricted according to one or more rules.

MDM system 5 can interact with mobile devices 10, and servers and resources 14 via any suitable number of device front ends 16. Device front ends 16 can be specialized software components that have been configured to interact with certain types of mobile devices. For example, a device front end related to an Apple iOS device is configured to work with Apple's server and the mobile device to gather any requested status information from the mobile device. Similarly, a device front end can be configured to work with an Android device, which may include the ability to communicate with an app running on the device. By providing a plurality of device front ends 16, software device front ends can easily be added to the MDM system 5 as mobile device platforms change or as an organization chooses to support new platforms. It should be appreciated that device front ends 16 include software and/or hardware components sufficient to communicate over network 12 to mobile devices 10, and servers and resources 14. Furthermore, device front ends 16 may also be configured to support the execution of actions that result from rules-based policies on the MDM system 5.

Device front ends 16 act as interfaces to gather status information pertaining to mobile devices 10, across network 12. In some embodiments, device front ends 16 regularly poll mobile devices 10, and servers and resources 14 to obtain status information on a periodic basis. In some embodiments, a portion of status information can also be regularly pushed from devices or servers on network 12 to the device front ends 16. When the device front ends 16 retrieve mobile device status information, this information is sent to message handlers 18. Message handlers 18 can include software components, such as one or more module, application, or thread. Message handlers 18 collect incoming data about mobile devices, format this status information into a usable form (which may include parsing and normalizing device information for uniformity across platforms), and forward this information to device database 20. It should be appreciated that message handlers 18 may include a plurality of handlers, each adapted to handle devices of a given mobile device platform. In some embodiments, each of message handlers 18 and device front ends 16 can be combined into a single software component.

Upon processing mobile device status information, message handlers 18 provide real-time status updates 22 to be stored and organized as records in device database 20. Device database 20 may include one or more records for each mobile device registered with MDM system 5. Using status updates 22, device database 20 can update these records and provide substantially real-time information about the status of mobile devices 10. Device database 20 can provide persistent storage of mobile device status information allowing an administrator to access status information about mobile devices 10, even when a device is offline. Device database 20 can include one or more data stores that include one or more software objects suitable for interfacing with one or more memory devices, including hard drives, flash drives, shared memory, cloud-based memory, etc. Furthermore, old status information in device database 20 can be compared to incoming status updates 22 to determine which attributes of a mobile device have changed on a substantially real-time basis. Accordingly, device database 20 can maintain status information about mobile devices enrolled with the MDM system as a series of device attributes that are updated on a substantially real-time basis.

In some embodiments, device database 20 can be used as part of the rules-based policy components of MDM system 5, which are shown in FIG. 1, as well as used for maintaining real-time inventory of mobile devices 10. Other components not shown in FIG. 1 may interact with device database 20 to retrieve inventory information for any monitoring purpose desired by an IT administrator. Accordingly, in some embodiments, device database 20 can be used as a database for storing a snapshot of the mobile device inventory (e.g. those devices enrolled for use of the corporate resources).

Figure 3:
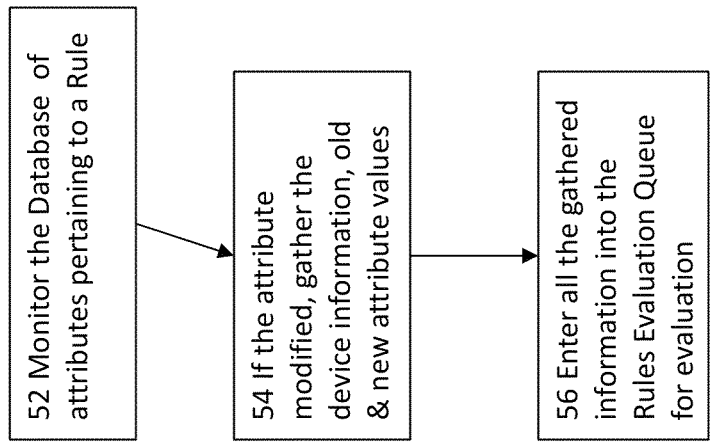
FIG. 3 is a flowchart of an exemplary method to monitor mobile device attributes for use with certain embodiments of the present invention.

Monitoring engine 24 can be a software component that is configured to interact with device database 20 to observe changes in status information. Monitoring engine 24 may receive pushed updates from device database 20 to inform the monitoring engine that a device attribute has changed. This can allow actions to be taken on device attributes immediately. In some embodiments, monitoring engine 24 regularly polls device database 20 to determine what, if any, device attributes related to mobile devices 10 have changed. In some embodiments, monitoring engine 24 determines if any attributes that are the subject of a rules-based policy have changed. In these embodiments, monitoring engine 24 is configured to observe certain attributes for changes after a policy related to those attributes has been added by an IT administrator. In some embodiments, monitoring engine 24 is preconfigured to look for changes to commonly used attributes, and may be further configured to look for certain attributes in response to administrator-defined rules. An exemplary algorithm that is carried out by monitoring engine 24 is shown in FIG. 3.

The monitoring engine 24 denotes any relevant changes in attributes of mobile devices in the rules evaluation queue 26. The rules evaluation 26 queue provides an interface between the monitoring engine 24, and the core rules engine 28. Mobile device status changes may wait in rules evaluation queue 26 until core rules engine 28 is free to process this information. Rules evaluation queue 26 may be any software component that maintains memory structures suitable for storing device status updates for access by core rules engine 28. In some embodiments, by using a rules evaluation queue, changes may be handled in a scalable manner. In some embodiments, the number of mobile devices 10 being monitored by MDM system 5 can be sufficiently large that updates to status information may arrive faster than core rules engine 28 may be able to process for limited periods of time.

Furthermore, in some embodiments, rules evaluation queue 26 provides a means for keeping track of compliance changes for mobile devices 10. In some embodiments, core rules engine 28 also places resulting actions (or information pertaining to actions) in rules evaluation queue 26. This can allow core rules engine 28 to monitor past actions and pending actions, along with new changes in status information of mobile devices. This can also allow the rules evaluation queue to provide information to core rules engine 28 regarding pending actions.

Core rules engine 28 is a software component responsible for evaluating device compliance with administrator-defined rules. These rules can include policy-based actions responsive to the compliance state of a mobile device with the policy rules. Core rule engine 28 retrieves device status information from rules evaluation queue 26 and applies administrator defined logic in the form of rules. The rules can define acceptable values for device attributes. Based on these values the core rules engine can determine whether a mobile device is out of compliance and depending on the attribute that is out of compliance, the core rules engine can select a responsive action as defined by the rules. In some embodiments, core rules engine 28 processes rules and initiates actions automatically, in real time in response to device attribute changes, without needed confirmation from an administrator.

In some embodiments, rules evaluation queue 26 is responsible for comparing device attribute values to administrator defined acceptable values. The rules evaluation queue can then present its determination regarding whether the device is out of compliance and of the reason for the out of compliance status to core rules engine 28. In these embodiments, core rules engine 28 can apply rules to the device attributes without needing to separately make a determination of whether the attribute is in compliance. In these embodiments, the core rules engine can then apply rules logic to the compliance state of the device, with the device attribute information preprocessed by the rules evaluation queue 26. This can facilitate scalability, as core rules engine 28 can begin with knowledge of whether a given attribute is in compliance or not.

For example, and administrator may determine that mobile devices that run file-sharing apps present a risk to corporate resources. The administrator may create a rule that causes a warning message to appear on a user's mobile device, if he is running a file-sharing app. The rule may also send an e-mail to the administrator. If a user installs a file-sharing app on his mobile device, device front ends 16 will determine that the file-sharing app has been installed and note this app in the device database 20. Monitoring engine 24, will determine that a list of apps installed on the device has changed and that the administrator is interested in what types of apps) are installed on mobile devices enrolled with MDM system 5 (or that the administrator is interested in certain apps. Monitoring engine 24 will then note the change in the mobile device status, placing an entry in rules evaluation queue 26 that reflects that the file-sharing app has been installed on the user device. Rules evaluation queue 26 or core rules engine 28 can compare the application to a list of blacklisted apps to determine if the newly installed app brings the device out of compliance. Core rules engine 28 may then apply a rule to the new compliance status of the device. The rule may state that if the device is out of compliance because it is running a file-sharing app, then a message should be sent to the user and the administrator. Core rules engine 28 will then execute this rule and will request that the action take place.

When an action is needed, according to a rule executed by core rules engine 28, the core rules engine can send one or more action requests 30 to an action execution controller 34. Action execution controller 34 may be a software module that is configured to facilitate the execution of actions. For example, an action that requires sending a warning to a user may require that action execution controller 34 interacts with an e-mail server to send an e-mail message to the user of the mobile device. Alternatively, the message may require that action execution controller 34 communicate with an app or the operating system of the mobile device. Action execution controller 34 may use device front ends 16 to communicate with the device. Similarly, actions related to wiping part or all of the memory of a device can be facilitated by action execution controller 34, using device front and 16 to communicate with the operating system of the mobile device across network 12 to initiate a remote data wipe. Other examples of actions that may be facilitated by action execution controller 34 can include interacting with servers and resources 14 to restrict the devices access at the server level. Other actions as described throughout can also be facilitated by action execution controller 34.

Upon evaluation of the rules by core rules engine 28, device database 20 may be updated to reflect any changes in the compliance status of the mobile device. Similarly, upon taking an action on a mobile device, core rules engine 28 may note the action in device database 20. Core rules engine 28 may send status updates 32 to device database 20 to maintain a record of actions and compliance state changes of the device.

In some embodiments, there may be a delay between action requests 30 and the actual completion of the action by the action execution controller 34. For example, if a device is off-line, it may be several hours or days before an action could be completed. Upon completion of the action, action execution controller 34 can send a confirmation 36 to rules evaluation queue 26. By placing the confirmation 36 into rules evaluation queue 26, core rules engine 28 can consider the final execution of the action. In some embodiments, rules can be defined that consider as input the action state of the device. For example, if a user is newly warned that his device is out of compliance, a rule may state that within two hours of the warning, the device should be restricted from accessing corporate resources if the user has not resolved the issue. Similarly, the core rules engine may consider a different action. For example, according to a rule, if confirmation of the originally planned action does not arrive within a predetermined time, such as 24 hours, an appropriate action may to be to restrict access to corporate resources at the server level in case the device has somehow gotten out of a managed state.

In some embodiments, MDM system 5 includes a user interface 38 that allows an IT administrator to view real-time device status information stored in device database 20, and to define rules for automatically taking actions on devices based on this status information. Accordingly, depending on the implementation, user interface 38 may interact with any or all of the components of MDM system 5. In some embodiments, user interface 38 interacts with core rules engine 28 to define a set of rules that will be enforced by core rules engine 28. Core rules engine 28 may include appropriate data stores for maintaining the rules defined by the user via user interface 38. In some embodiments, these rules may also be changed via configuration files or the like. User interface 38 can include software instructions and rendering information such as pictures, HTML, style sheets, flash files, and the like, which may be used to instruct a computer controlled by the administrator to display an interface, such as the interfaces depicted in FIGS. 5-11. It should be appreciated that the interface may include one or more websites or portals that may be remotely accessed.

MDM system 5 may be implemented on one or more computing devices. This may include, in some embodiments, a cloud-based implementation, whereby different components of MDM system 5 reside on different computers on a network, or are replicated across different computers on a network to provide flexible scalability. It should be appreciated that these computing devices may include hardware and software executing on a processor that perform the roles discussed with respect to FIG. 1. Each component of the MDM system can be a separate software module, part of a shared software module, and can include one or more threads for carrying out the role of each component that execute on one or more processors in a suitable processing environment, such as a Linux or Window-based server environment.

Figure 2:
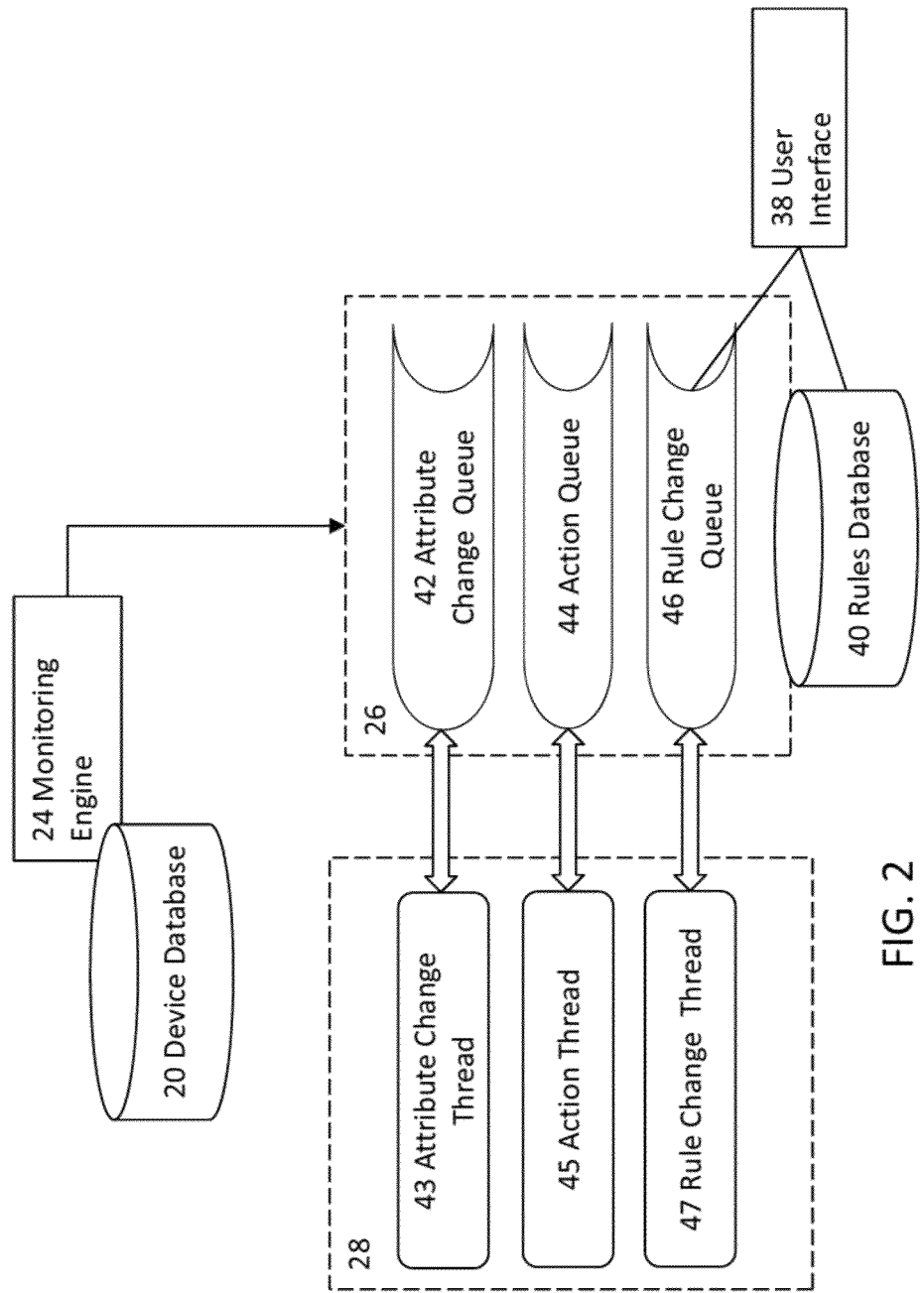
FIG. 2 is a system diagram of an exemplary mobile device management (MDM) system for use with certain embodiments of the present invention.

FIG. 2 shows a detailed view of the rules evaluation queue 26 and core rules engine 28 for use with some embodiments of the present invention. In these embodiments, user interface 38 is used to define rules in a rules database 40, which may be accessed by core rules engine 28 and rules evaluation queue 26. Rules evaluation queue 26 includes three primary queues. Attribute change queue 42 can be used to process changed attribute values. These values can be used to determine the current state of compliance of a mobile device. The attribute change queue 42 provides an input to core rules engine 28 for determining which actions may be applicable based on administrator defined rules. A corresponding thread, attribute change thread 43, runs as part of core rules engine 28. This thread is responsible for monitoring attributes in attribute change queue 42. Attribute change thread 43 may then apply the rules from the rules database 40 to determine if an action needs to be taken.

If an action needs to be taken, action thread 45 will work with attribute change thread 43 to initiate a resulting action. Action thread 45 will place pending actions in action queue 44, which can be part of rules evaluation queue 26. Action queue 44 can include a list of past actions and pending actions, which may be useful for core rules engine 28 to determine appropriate subsequent actions.

Rule change queue 46 can be used for new or edited rules defined by an administrator using user interface 38. For example, when an administrator defines a new rule, it may be necessary to reevaluate each mobile device enrolled in the network to determine if the new rule requires an action. Corresponding rule change thread 47 of the core rules engine can monitor rule change queue 46 and can evaluate the rule and each mobile device based on information stored in the device database 20. Similarly, resulting actions from rule change thread 47 can be handled by action thread 45. The details of the operation of core rules engine 28, in some embodiments, are disclosed with respect to FIG. 4.

When monitoring engine 24 determines that an important attribute in the device database 20 has changed, monitoring engine 24 will place this new attribute value into attribute change queue 42. This attribute change can then be immediately (or after its place in the queue is reached) evaluated by the attribute change thread 43, resulting in new actions to be taken based on rules in rules database 40. These actions may be handled as discussed with respect to FIG. 1 and recorded in action queue 44.

FIG. 3 shows an exemplary algorithm 50 that may be used by monitoring engine 24. At step 52, monitoring engine 24 monitors device database 20 for attributes related to rules defined by an administrator. These attributes may be all or a subset of available status information pertaining to each device. Step 52 may occur at regular intervals (e.g. polling), or in response to each update for each device in device database 20. At step 54, monitoring engine 24 determines if the attribute has been modified. If the device attribute has been modified, monitoring engine 24 will gather information about the device, including, in some embodiments, both the old attribute value and the new attribute value. In some embodiments, additional attribute information pertaining to the advice will also be captured. At step 56, the gathered information is placed into the rules evaluation queue 26 for evaluation by the core rules engine, such that rules-based actions may be initiated in response to the new attribute values.

Figure 4:
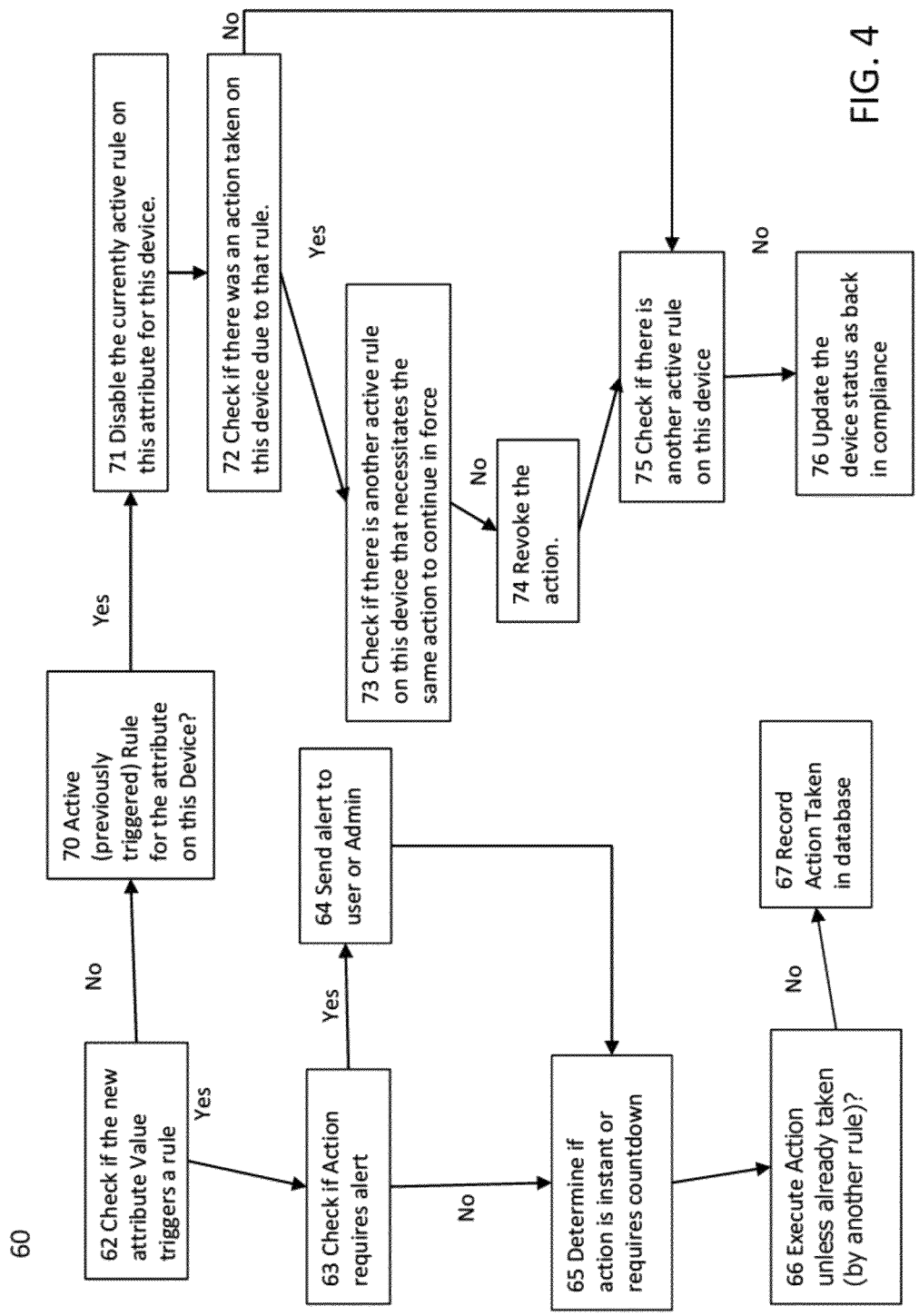
FIG. 4 is a flowchart of an exemplary method to execute rules-based actions for use with certain embodiments of the present invention.

FIG. 4 shows an exemplary algorithm 60 for use with some embodiments of core rules engine 28. At step 62, the core rules engine views and attribute in the attribute change queue 42. This attribute is then compared to attribute values defined in rules to determine if the new attribute value triggers an action according to one or more of the rules. At step 63, the resulting action is considered, and a determination is made whether the action requires an alert or not. If an alert is required, according to the rule, an alert will be sent to the user of the mobile device and/or an administrator as specified in the rule at step 64.

If no alert is required (or once an alert has been sent and an additional action is needed, according to the rule), an appropriate action can be taken. Exemplary actions that may be taken are discussed throughout this specification. At step 65, the core rules engine determines whether an action can be taken immediately, or whether the rule requires waiting for a predetermined amount of time (e.g. a grace period). In some embodiments, the rule may specify an action having a countdown or predetermined timeframe during which corrective action may be taken by the user. For example, if a user's mobile device is newly out of compliance, he may be warned that his device is out of compliance and be given two hours to fix the problem. If a grace period is appropriate, at step 65, a countdown can be started so that a corrective action can be taken when the countdown expires. Action queue 44 may be used to facilitate actions for which a countdown has begun.

Once any grace period has expired (or the action should be immediately taken under the rule), the action can be taken. However, in some situations, actions may have already been taken against a device, such as actions taken by other rules already triggered. It may not be desirable or feasible to repeat an action. At step 66, the core rule engine determines if an action has not yet been taken, and if not, will take that action, as defined by the rule.

At step 67, once an action has been initiated, the action request can be recorded in the database, such as device database 20. In some embodiments, pending actions may be placed in action queue 44 and confirmation can subsequently be received to verify that the action has indeed occurred. In some embodiments, once an action has been taken on a mobile device, attributes related to the compliance date and the action taken can be updated in device database 20, so that these actions can be considered in the future.

If an attribute changes to a value that is in compliance, algorithm 60 may proceed to step 70. At step 70, previously triggered rules relating to the attribute are considered. These rules are said to be active. For example, if a user previously had installed a file-sharing app and his e-mail access was restricted, when the user removes the offensive application, algorithm 60 may proceed to step 70. At step 70, core rules engine 28 may consider that the rule that previously blocked the users e-mail access is no longer triggered by the new attribute value. Core rules engine 28 may then begin the process of restoring the user's e-mail access. If there are no active rules for the newly changed attribute, core rules engine 28 can proceed to the next attribute in the attribute change queue.

If the new attribute value results in a more compliant device, core rules engine 28 may proceed to step 71. At step 71, core rules engine 28 can disable (e.g., reset) the currently active rule that had been previously been applied to the now compliant attribute.

At step 72, the core rules engine considers whether or not the previous attribute value had resulted in an action on the mobile device. For example, if a previous attribute value made the device noncompliant with a rule regarding e-mail access, the rule may previously have resulted in action, whereby the users e-mail access was restricted. If the new attribute value, according to the rule, should not result in the same action, core rules engine 28 can consider whether to revoke (i.e., undo) the previous action. For example, for a newly compliant device that previously had its e-mail access restricted, it may be appropriate to revoke this restriction and restore e-mail access to the device.

At step 73, core rules engine 28 considers whether there are any other reasons for the action associated with the previously active rule. For example, there may be multiple noncompliant attributes for a mobile device that have resulted in blocking a user's e-mail access. Step 73 allows the core rules engine to determine whether or not that e-mail access may be restored now that one of the noncompliant attributes is in compliance. Step 73 considers the previously recorded actions for this mobile device and determines if there are other rules that have taken (or previously attempted to take) the action now sought to be revoked.

In some embodiments, step 73 benefits from recording of actions at step 67. In some embodiments, redundant actions may also be recorded at step 67, without repeating the action. For example, once a noncompliant device's e-mail access has been blocked, a subsequent rule that also would result in blocking the e-mail access may be recorded in a database without repeating a step of blocking the e-mail access, which is already blocked.

If there are no other rules that explain the previous action, the previous action can be revoked at step 74. In the example of restricted e-mail access, e-mail access can be restored by communicating over a network to e-mail server to once again allow the mobile device to receive e-mail messages.

At step 75, core rules engine 28 considers whether there are any other rules that have been triggered on this device that indicate the device is noncompliant. This step can allow the device to be restored to a fully compliant state once no rules are triggered. For example, a device whose e-mail access has now been restored may be still noncompliant with other rules related to corporate data access or access to other resources. At step 75 other rules pertaining to the device and previously recorded actions related to other rules can be considered. If there are no other rules that are triggered on the device, core rules engine 28 can update the device database to indicate that the device is now fully compliant with all rules.

Figure 5:
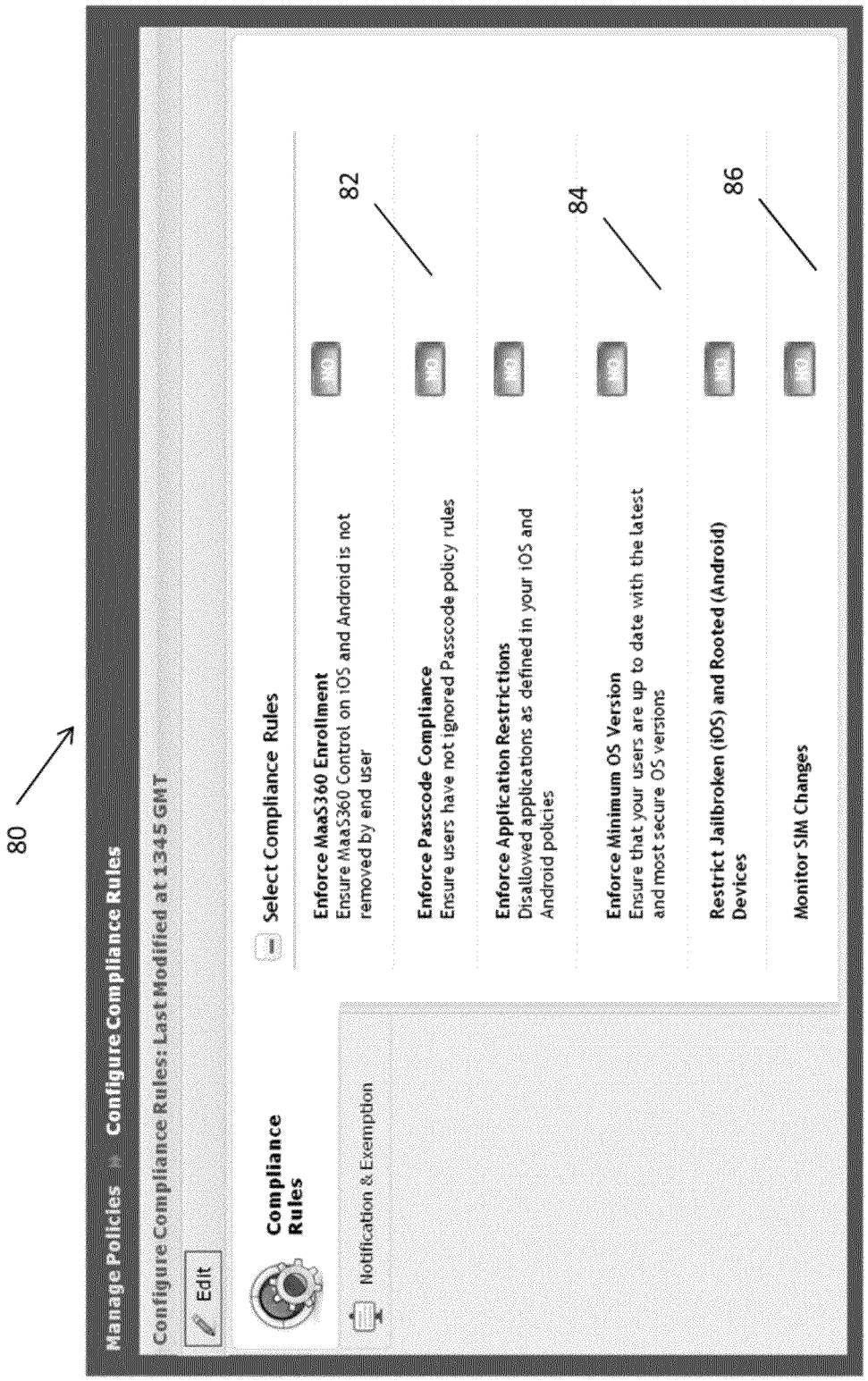
FIG. 5 is a screenshot of available rules that may be configured by an administrator for use with certain embodiments of the present invention.

FIG. 5 shows an exemplary screen shot for a user interface 80 provided to an administrator for managing rules used by MDM system 5. Using a web based interface or an application, and administrator may login to the MDM system and be presented with a variety of types of available compliance rules. These compliance rules can present preconfigured templates that may be used to set up common security or management rules. In this example, and administrator may require that devices be enrolled with the MDM system (called MaaS360 in this example) to be granted access to corporate resources. Enrollment may require that the user agree to a "terms of use" policy and register his identity and the identity of his device with the MDM system an install a certificate to authenticate the user. The user may also be required to grant permissions to the MDM system to resources and the user's mobile device. This can allow the MDM system to configure resources and monitor and configure the user's device. In some mobile platforms, such as the Android platform, the user may also be required to download an app that provides added functionality for the MDM system to access the user's device and configuration information.

Rule 82 may be used to ensure that a user is securing his mobile device using a pass code. An administrator may click a button associated with the enforce passcode compliance template to configure and enforce a passcode rule. Additional rules that may be available through user interface 80 can include templates to configure application restrictions, such as identifying blacklisted applications, templates to enforce minimum OS versions for the mobile device to ensure that the users mobile device is running a recent version of a mobile operating system as shown in template 84, a template for limiting the ability of rooted or jail-broken mobile devices from accessing corporate resources (which can ensure that users do not have root access to his device, which may indicate the device is a higher risk device or is difficult to manage securely), and a template to restrict device access when the device has recently changed the SIM card being used, such as template 86.

Other available rule templates may include a template for enforcing control and management that verifies that the mobile OS is authentic and functioning properly, a template for monitoring the roaming state and data usage of the device, a template for requiring that data on the mobile device related to corporate resources is encrypted, a template for identifying conditions and configuring the device for remote wipe capabilities, and a template for restricting access to corporate resources. When the device does not have sufficient permissions to access e-mail resources. Other action based rule templates may include any suitable rules for performing the functions of an MDM system, as discussed throughout this application.

Figure 6:
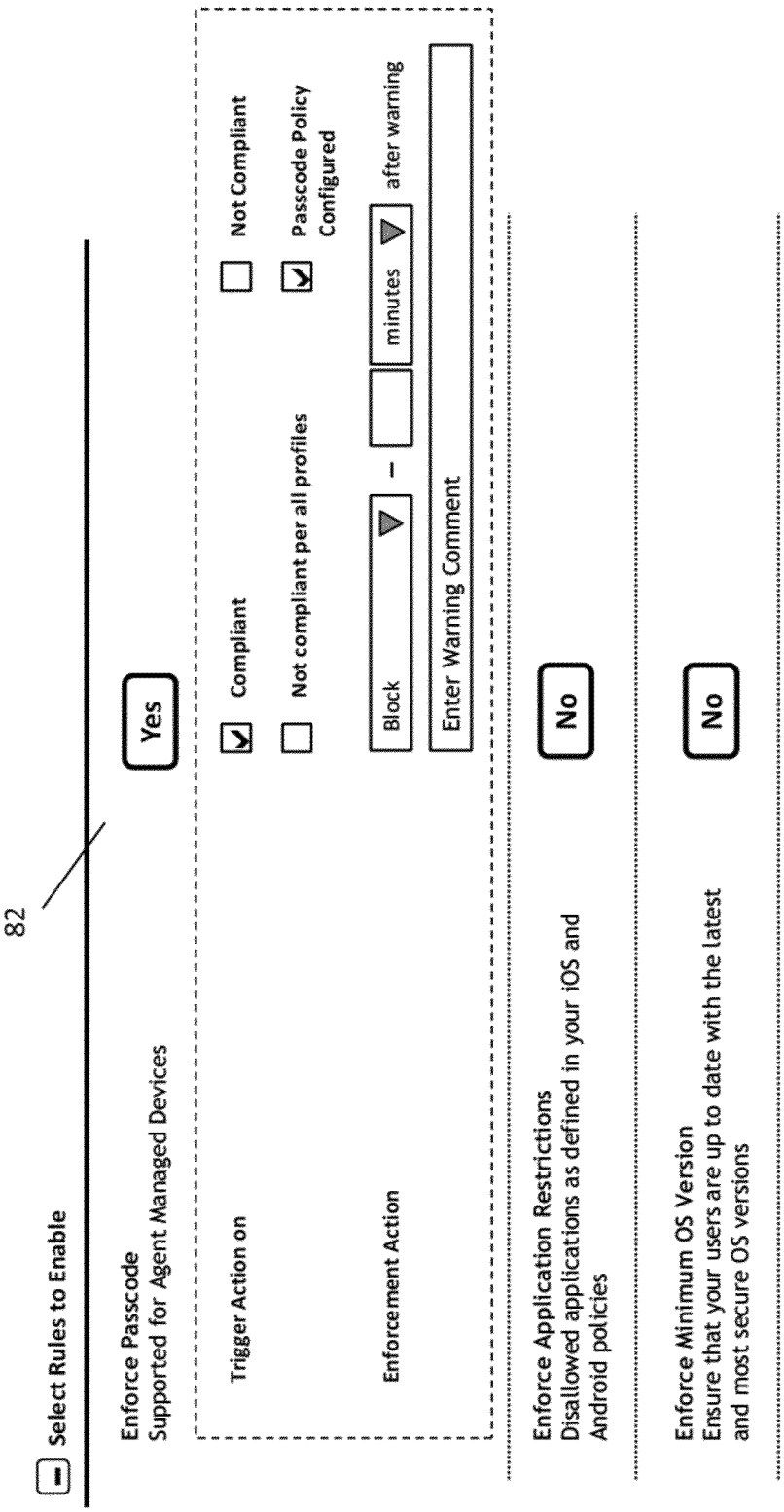

FIG. 6 shows the user interface for configuring passcode rule 82. By clicking a button associated with the template in interface 80, a template may appear in the user interface to allow the administrator to configure the specifics of the enforced passcode rule. This template may have two sections: a trigger section and an enforcement section. By selecting boxes in the trigger section, an administrator may identify whether the rule should be applied to compliant devices or noncompliant devices (e.g., those devices that do not have a passcode set up). Most rules discussed throughout have assumed a rule applies to a noncompliant device. In some embodiments, a rule may be triggered by a compliant device, such as a rule that configures a service only when a device has come into compliance. The administrator may also select a passcode policy, such as a policy that identifies the minimum passcode strength required to be compliant. The selected policy may be a preconfigured policy or a custom policy defined by the administrator, in some embodiments.

In an enforcement section of the template, the type of action to be taken in response to the selected trigger can be identified. An administrator may select a drop-down box that gives the available options for actions. For example, an administrator may choose to block the device from a selected corporate resource. He may also select a grace period and a warning message (which may be tailored to the rule) to be displayed to a user of out of compliance device before the action occurs. This may enable the user to bring his device back into compliance before an action takes place.

FIG. 7 shows a template 84 that may be selected to enforce minimum OS versions required for a mobile device to access corporate resources. By selecting a button in user interface 80, an administrator can bring up a template to create a rule that excludes devices with certain operating systems or older versions of operating systems. In some embodiments, the template can be divided into two sections, a trigger section and enforcement section. Here, a trigger section allows the administrator to select the minimum version of multiple operating systems. A separate drop-down menu can be provided for iOS, Android, Symbian, Windows Phone, or other mobile device OSs. An enforcement section may allow the administrator to select appropriate enforcement actions if the rule is triggered. This may include blocking the mobile device's access to certain corporate resources, and may include providing a grace period and warning message to the user. In some embodiments, the enforcement action may also allow an alert to be sent to the administrator automatically when the device is out of compliance with the rule.

FIG. 8 shows an exemplary template 86 for configuring a rule that restricts access when a device has changed SIM cards. A mobile device that has switched SIM cards may be an indication that the device has been stolen. By selecting a button from user interface 80, the administrator may be presented with a template for defining the rule. In some embodiments, where the triggering condition is defined by the type of rule, the template may include only an enforcement section that allows the administrator to define the type of action to take when the device is out of compliance.

In some embodiments, and administrators may configure e-mails to be sent to administrators when devices become noncompliant. Furthermore, administrators may also identify certain devices that should be exempt from certain actions. For example, a VIP of an organization, such as CEO may not want to have his e-mail access disabled without an administrator speaking to him first. In certain situations, the relationship of an individual mobile device to the organization may be unique and warrant exemptions from rules that may otherwise get in the way of an organization's business. FIG. 9 presents a user-interface that may be suitable for configuring some of the settings. The interface may allow administrators to define administrative e-mail addresses to receive alerts related to device compliance issues. The interface may also allow certain devices to be selected to be exempt from rules.

In some embodiments, the device database may include a log of all actions taken on a device during a predefined period, such as a six-month period. This log may be used by administrators to view actions taken on devices, rather than (or in addition to) relying on separate e-mails for each device way rules triggered. This can be used for determining a pattern of behavior. Similarly, log files may be e-mailed to administrators, rather than sending individual e-mails relating to each device and each rule triggered.

FIG. 10 shows an exemplary screen shot for another embodiment user interface provided to an administrator for managing rules used by MDM system 5. Using a web based interface or an application, and administrator may login to the MDM system and be presented with a variety of types of available compliance rules. These compliance rules can present preconfigured templates that may be used to set up common security or management rules. In this example, and administrator may require that devices be enrolled with the MDM system (called MaaS360 in this example) to be granted access to corporate resources.

Additional rules that may be available through the user interface of FIG. 10 can include templates to enforce minimum OS versions for the mobile device to ensure that the users mobile device is running a recent version of a mobile operating system, templates to create a rule to remotely wipe a device (e.g. when the device is extremely out of compliance or appears to be stolen, such as when the device has recently changed the SIM card being used or is reported missing), a template to require that data on the device is encrypted, a template to configure application restrictions, such as identifying blacklisted applications, a template for limiting the ability of rooted or jail-broken mobile devices from accessing corporate resources (which can ensure that users do not have root access to his device, which may indicate the device is a higher risk device or is difficult to manage securely), and a template to restrict device access to specific corporate resources.

Figure 11:
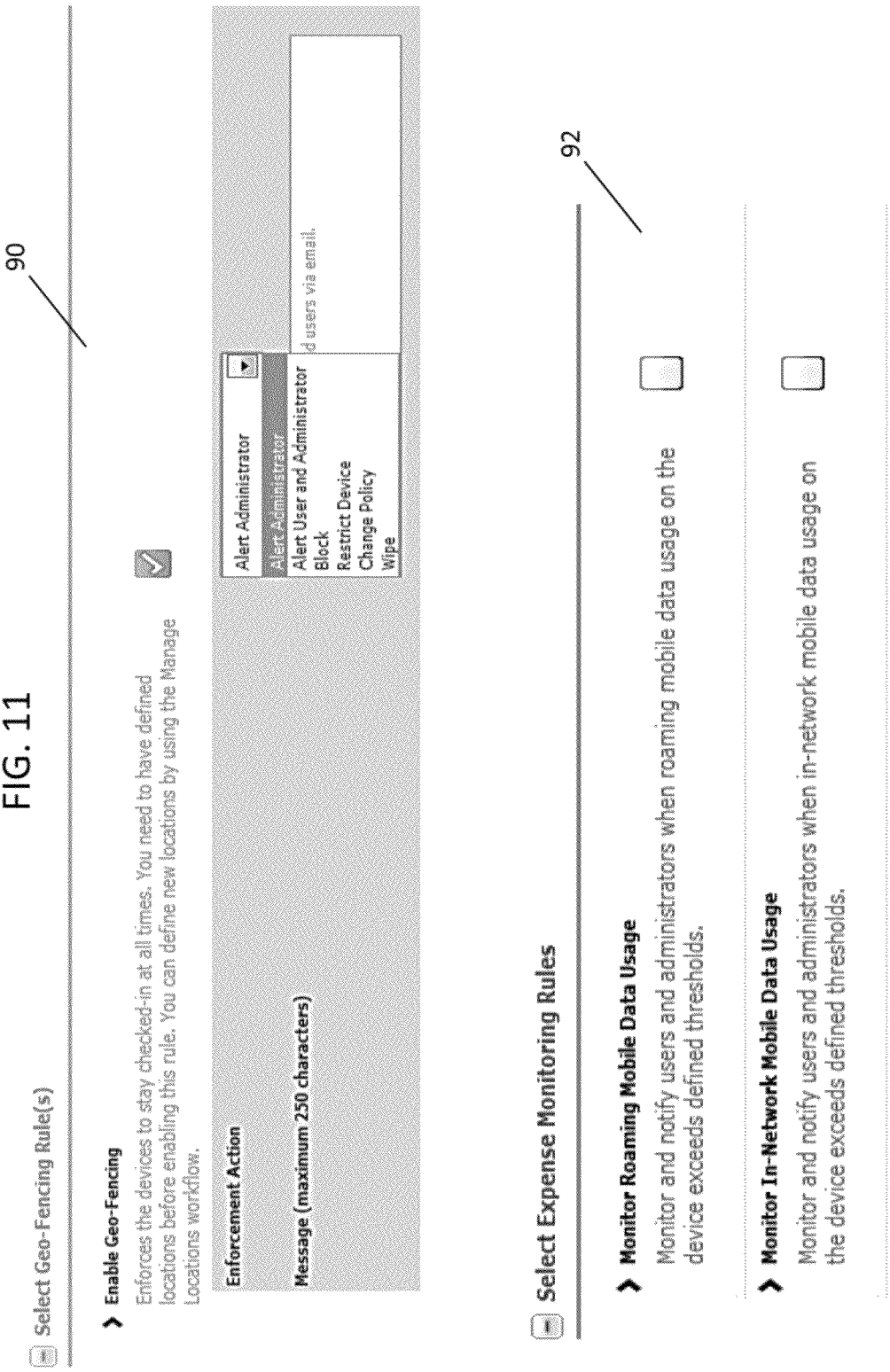
FIG. 11 is screenshot of exemplary templates for configuring rules-based actions for use with certain embodiments of the present invention.

FIG. 11 shows templates that may be selected to enforce other rules that may be suitable to monitoring inventory and controlling data charges. For example, a template 90 may be used to define geo-fencing rules. Geo-fencing rules may restrict a device's functionality based on the location of the device. For example, a device may have data access restricted if out of the country to save cost or change the device's access permissions when the device is operating while at a company facility versus when the device is at an untrusted location, such as an airport or another city. To apply a geo-fencing rule, an MDM system can gather location information about a device and compare that information to compliance criteria. Location information may include GPS information from the device that indicates a geographic location, Wi-Fi information, reflecting an IP address to indicate location, or network information, such as the carrier information, which may reflect the general or specific location of the device or nearest cell-tower. Compliance may be based on a whitelist, a blacklist, and/or a lookup or calculation from the location information to determine an estimate of the physical location of the device.

Furthermore, the device may be required to check in with the MDM system on a regular basis to ensure that geo-fencing remains up-to-date. A device that fails to check in may have access to resources restricted at the server level. Available actions may include alerting both the user of the device and/or an administrator, restricting the device's access to certain sensitive resources, blocking access to all resources, changing policies on the device, or wiping the device.

Template 92 may be used to monitor data usage. When these rules are selected, alerts may be sent to the user and/or the administrator that a user is approaching data limits. These limits may be separate for in-network data usage and for out-of-network data usage, which may be billed at a more expensive rate.

Table 1 shows an exemplary list of the types of rules that may be selected by an administrator, the attributes considered by the rule for determining compliance, and the available actions that may be selected by the administrator when the rule is triggered.

TABLE 1

| Rule Type | Attribute/Comments | Available Actions |
|---|---|---|
| Enforce Minimum Operating System Version | Operating System > OS Version | Alert, Block, Wipe, Selective Wipe, Change Policy |
| Enforce Remote Wipe Support | Security Compliance > Remote Wipe Support | Alert, Block, Selective Wipe, Change Policy |
| Enforce Full Encryption Support | Security Compliance > Hardware Encryption | Alert, Block, Wipe, Selective Wipe, Change Policy |
| Enforce Applications Compliance | Security Compliance > Policy Compliance State | Alert, Block, Wipe, Selective Wipe, Change Policy |
| Restrict Jailbroken or Rooted Devices | Security Compliance > Device Rooted and Security Compliance > Device Jailbroken | Alert, Block, Wipe, Selective Wipe, Change Policy |
| Monitor SIM Changes | Network Information > SIM (ICCID) ID | Alert |
| Enforce Management and Control | Hardware Inventory > Managed Status | Alert, Block, Wipe |
| Restrict Corporate Resources for devices blocked on mail server | Security Compliance > Mailbox Approval State | Alert, Wipe, Selective Wipe, Change Policy |
| Monitor Roaming Changes | Network Information > Roaming | Alert, Block, Wipe, Selective Wipe, Change Policy |
| Enable Geo-fencing | Location Information | Alert, Block, Wipe, Selective Wipe, Change Policy |
| Monitor Roaming data usage | Roaming data used as per billing plan | Alert, Alert Administrator only and Alert User only. |
| Monitor In-network data usage | In network data usage as per billing plan | Alert, Alert Administrator only and Alert User only. |
| Enforce Passcode | Enforce Passcode > Passcode | Alert, Block, Wipe, Selective Wipe, Change Policy |

TABLE 2

| Attribute | Description | Data Type |
|---|---|---|
| Device ID | Unique ID of the Device in the $3^{rd}$ party application | String |
| Is New | Flag that indicates whether the device is new and whether its data is being uploaded for the first time. | Boolean - Yes/No |
| Device Name | Name of the device | String |
| Serial Number (IMEI/ESN) | IMEI or ESN for the device depending on whether the device supports GSM or CDMA | String |
| Email Address | Corporate Email address of the user of the device. Typically this is used to register the device. | String |
| Username | AD Username of the user of the device - Typically this is used to register the device. | String |
| Domain | Domain of the user of the device | String |
| Installed Date Time (GMT) | Activation date/time of the device in the $3^{rd}$ party application. This should be in GMT | Timestamp |
| Last Reported Time (GMT) | Last Sync date/time of the device in the $3^{rd}$ party application. This should be in GMT | Timestamp |
| Platform | Device Platform - One of following values - iOS, Android, Windows Mobile, Windows Phone 7, Symbian, Palm, BlackBerry, Others | Enumeration |
| Source | Name of the $3^{rd}$ party application that is providing the data | String |

Appendix A: Examples of Data Formats

The following are examples of the data formats that can be used for storing information about mobile devices in the mobile device database 20.

An exemplary list of the core/generic attributes for describing mobile device 10 is shown in Table 2.

An exemplary list of the attributes for hardware, including corporate servers and the hardware on the customer premises for hosting the cloud extension agents is shown in Table 3 and Table 4. Table 3 shows the static or basic data associated with hardware, while Table 4 shows dynamic data associated with the hardware that is likely to change on incremental state changes.

TABLE 3

| Attribute | Description | Data Type |
|---|---|---|
| Device ID | Unique ID of the Device in the $3^{rd}$ party application | String |
| Device Type | Possible device types - Desktop, Laptop, Server, Smartphone, Tablet or Others | Enumeration |
| Manufacturer | Manufacturer of the device | String |
| Model | Model Name of the device | String |
| Model ID | Model ID of the device | String |
| Platform Serial Number | Platform specific serial of the device. For ex: Apple Serial Number, PIN, etc. | String |
| UDID | UDID or UUID of the device | String |
| Operating System | Operating System and Major Version of the device. For ex: iOS 4 | String |
| Operating System Version | Full Operating System version including the build number | String |
| Software Platform Version | Software Platform version (specific to BlackBerry) | String |
| Modem Firmware Version | Specific to iOS, Modem Firmware Version | String |
| Total Internal Storage | Total internal memory of the device in GB | Float |
| Total External Storage | Total external (SD card) memory of the device in GB | Float |
| RAM | RAM on the device (in MB) | Integer |
| Screen Width | Screen width of the device | Float |
| Screen Resolution | Screen resolution of the device | String |
| Screen Language | Screen Language of the device | String |
| Time zone | Current time zone offset of the device. Ex: +0530 | String |
| Last Reported Time (GMT) | Last Sync date/time of the device in the $3^{rd}$ party application. This should be in GMT | Timestamp |

TABLE 4

| Attribute | Description | Data Type |
|---|---|---|
| Device ID | Unique ID of the Device in the $3^{rd}$ party application | String |
| Available Internal Storage | Free internal memory of the device in GB | Float |
| Available External Storage | Free external memory of the device in GB | Float |
| Total Application Data | Total size of data across all applications on the device | Float |
| Battery Level | Current battery level (in percentage) of the device | Float |
| Battery Condition | Current condition of the device battery | String |
| Last Reported Time (GMT) | Last Sync date/time of the device in the $3^{rd}$ party application. This should be in GMT | Timestamp |

An exemplary list of the attributes related to security and compliance status of a mobile device is shown in Table 5. In addition, information related to the particular states of the device related to Exchange ActiveSync or BES attributes may be stored.

TABLE 5

| Attribute | Description | Data Type |
|---|---|---|
| Device ID | Unique ID of the Device in the $3^{rd}$ party application | String |
| Jailbroken or Rooted Device | Applicable to iOS and Android devices. Indicates whether the device is Jailbroken, in case of an iOS device or whether it is Rooted, in case of an Android device | Boolean |
| Device Password Status | Whether the Password is required to use the device and what is the status of the device with regards to Password policy Compliant Not Enabled Not Compliant per all requirements Not Compliant per Profiles Passcode Policy Configured Passcode Policy Not Configured Not Available | Enumeration |
| Minimum Password Length | Minimum length of the password enforced on the device | Integer |
| Password Quality | Quality of the password enforced Numeric Alphabetic Alpha-numeric | Enumeration |
| Maximum Time to Lock | Time in minutes after which the device will automatically lock | Integer |

TABLE 5-continued

| Attribute | Description | Data Type |
|---|---|---|
| Maximum Failed Password Attempts for Wipe | Number of failed password attempts after which the device will automatically wipe | Integer |
| Encryption Status | Encryption Status of the device<br>No Encryption<br>File-level Encryption (iOS only)<br>Block-level Encryption (iOS only)<br>File & Block-level Encryption (iOS only)<br>Partial Encryption<br>Encryption Complete | Enumeration |
| Policy Name | Name of the policy enforced on the device | String |
| Policy ID | A unique identified for the policy on the device | String |
| Policy Version | Currently enforced version of the policy | Integer |
| Last Policy Update Date/Time | Last date/time when any policy update was given to the device. This should be in GMT | Timestamp |
| Policy Compliance Status | Whether the device is in compliance per applied policies. Possible values: In-Compliance, Out-of-Compliance | Enumeration |
| Is Remote Wipe Supported | Whether remote wipe is supported by the device | Boolean |
| Device Wiped | Status of wipe action sent to the device. Possible values: Pending, Complete | Enumeration |
| Last Wipe Applied Date/Time | Date/time when Wipe was applied. In case multiple wipe commands can be sent to the device (like in case of Exchange server), this should be the last date/time for the wipe. This should be in GMT | Timestamp |
| Last Time Message Received by Device | Last time message was received by the device | Timestamp |
| Last Time Message Sent from Device | Last time message was sent from the device | Timestamp |
| Auto-Backup Configured | Whether automatic backup is configured for the device | Boolean |
| Auto-Backup Frequency | Frequency of automatic backup<br>Daily<br>Weekly<br>Monthly<br>Others | Enumeration |
| Last Successful Backup Time | Last time there was a successful backup from the device | Timestamp |
| Auto-Backup Exclusions | Items excluded from automatic backup<br>Messages<br>PIM Data<br>MMC Data | Enumeration |
| Allow User to install applications | Allow the user to install applications | Boolean |
| Last Reported Time (GMT) | Last Sync date/time of the device in the 3$^{rd}$ party application. This should be in GMT | Timestamp |

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for providing device management services comprising steps of:
gathering, at a server, from a network, status information related to an operating state of each of a plurality of mobile devices, each mobile device utilizing one of a plurality of different mobile operating systems, wherein the status information for each mobile device is gathered from a plurality of sources including each mobile device in a substantially real time manner;
formatting the status information for each of the mobile devices, such that rules can be substantially uniformly applied to the status information across the plurality of different mobile operating systems;
storing the status information in an electronic database accessible to the server;
evaluating, at the server, a first compliance state of each of the mobile devices from the status information using a plurality of administrator-defined rules, wherein each of the rules applies to mobile devices regardless of mobile operating system; and
initiating, at the server, at least one action defined by the administrator-defined rules in response to the step of evaluating,
wherein the step of evaluating is performed by the server automatically, in response to changes in the status information in the electronic database.

2. The method of claim 1, wherein the at least one action is selectable from a plurality of actions, comprising blocking access by the at least one of the mobile devices to a corporate resource.

3. The method of claim 1, wherein the at least one action is selectable from a plurality of actions, comprising blocking e-mail access for the at least one of the mobile devices.

4. The method of claim 1, wherein the at least one action is selectable from a plurality of actions, comprising wiping information from the at least one of the mobile devices.

5. The method of claim 1, wherein the at least one action is selectable from a plurality of actions, comprising warning a user of the at least one of the mobile devices that further action may be taken.

6. The method of claim 1, wherein the step of gathering status information, for the at least one mobile device, comprises gathering information from that mobile device and at least one other source on the network.

7. The method of claim 1, further comprising the step of subsequently evaluating a second compliance state of at least one of the mobile devices to determine if the at least one action should be revoked.

8. The method of claim 1, wherein the plurality of different mobile operating systems comprise at least operating systems compliant with Android and iOS specifications.

9. The method of claim 1, wherein the status information comprises location information about each mobile device.

10. A method for providing device management services comprising steps of:
receiving, at a server, a plurality of attributes related to an operating state of each of a plurality of mobile devices, each mobile device utilizing one of a plurality of different mobile operating systems, wherein the attributes for each mobile device are gathered from a plurality of sources including each mobile device;
making a determination that an attribute of a mobile device has changed;
evaluating the attribute, by a processor at the server in response to the determination, to determine if the attribute change triggers at least one of a plurality of administrator-defined rules, which indicates that the attribute is out of compliance, wherein each of the rules applies to mobile devices regardless of mobile operating system; and
automatically initiating, at the server, an action defined by the at least one of a plurality of administrator defined rules if the attribute is out of compliance,
wherein the attribute is stored in a data store accessible to the server, that includes substantially real-time data, gathered from the plurality of sources on a network and pertaining to a plurality of attributes of a plurality of mobile devices, wherein the substantially real-time data is formatted, such that the rules can be substantially uniformly applied to the plurality of attributes across the plurality of different mobile operating systems.

11. The method of claim 10, wherein the step of automatically initiating an action comprises warning a user of the mobile device that the device is out of compliance and subsequently causing the action to be performed if the attribute remains out of compliance after a period of time defined in the at least one rule.

12. The method of claim 10, further comprising the step of automatically revoking the action if the attribute is brought back into compliance.

13. The method of claim 12, wherein the step of automatically revoking the action comprises determining if another of the plurality of rules is triggered.

14. The method of claim 10, further comprising the step of gathering the plurality of attributes for at least one of the plurality of mobile device by gathering attribute information from that mobile device and at least one other source on a network.

15. The method of claim 10, wherein the plurality of different mobile operating systems comprise at least operating systems compliant with Android and iOS specifications.

16. The method of claim 10, wherein the attribute comprises location information about the mobile device.

17. A system for providing device management services comprising:
a data store configured to be accessible by a server;
a CPU of the server coupled to a memory configured to execute computer readable instructions;
computer readable instructions for execution on the server comprising instructions configured to:
automatically make a determination that an attribute of a mobile device stored in the data store has changed;
evaluate the attribute, in response to the determination, to determine if the attribute change triggers at least one of a plurality of administrator-defined rules, which indicates that the attribute is out of compliance, wherein each of the rules applies to mobile devices regardless of mobile operating system; and
automatically initiate an action defined by the at least one of a plurality of administrator defined rules if the attribute is out of compliance,
wherein the data store is configured to gather substantially real-time data pertaining to a plurality of attributes related to an operating state of each of the plurality of mobile devices, the attributes for each mobile device being gathered from a plurality of sources including each mobile device, wherein each mobile device utilizes one of a plurality of different mobile operating systems, and the substantially real-time data is formatted, such that the rules can be substantially uniformly applied to the plurality of attributes across the plurality of different mobile operating systems.

18. The system of claim 17, wherein the computer readable instructions further comprise instructions configured to present a user interface to an administrator to allow selection of at least one attribute and one available action to define the at least one of the plurality of administrator defined rules.

19. The system of claim 18, wherein at least one of the actions comprises warning a user of the mobile device that the device is out of compliance and causing subsequent action to be performed if the attribute remains out of compliance after a period of time defined in the at least one rule.

20. The system of claim 17, wherein the computer readable instructions further comprise instructions configured to automatically revoke the action if the attribute is brought back into compliance.

21. The system of claim 17, wherein the computer readable instructions further comprise instructions configured to gather the plurality of attributes for at least one of the plurality of mobile device by gathering attribute information from that mobile device and at least one other source on a network.

22. The system of claim 17, wherein the plurality of different mobile operating systems comprise at least operating systems compliant with Android and iOS specifications.

23. The system of claim 17, wherein the attribute comprises location information about the mobile device.

* * * * *